Dec. 8, 1970          W. D. FAGAN          3,545,200
                   LINK CHAIN CONNECTOR
Filed June 14, 1969                    2 Sheets-Sheet 1
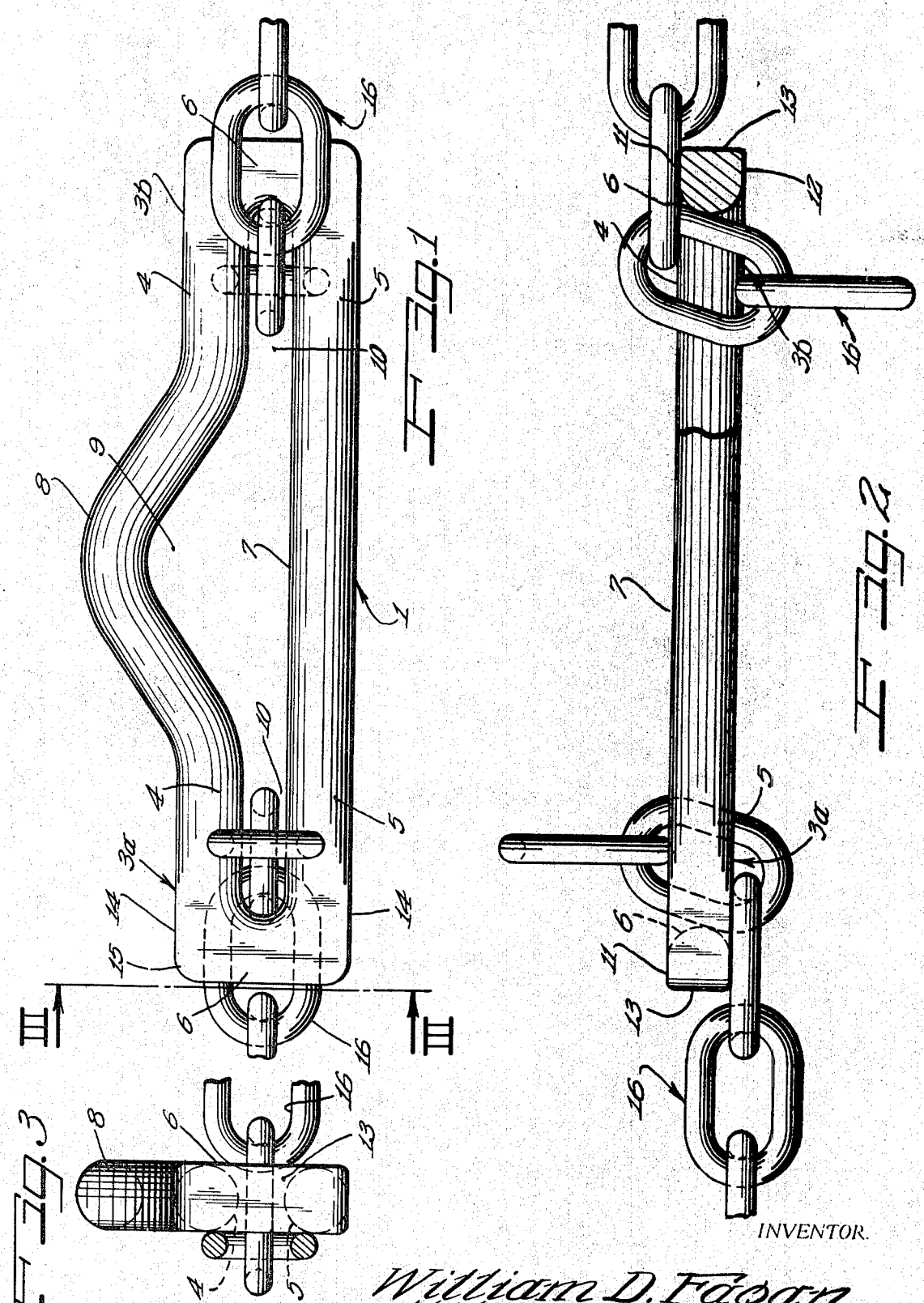
INVENTOR.
William D. Fagan
BY Hill, Sherman, Meroni, Gross & Simpson
ATTORNEYS

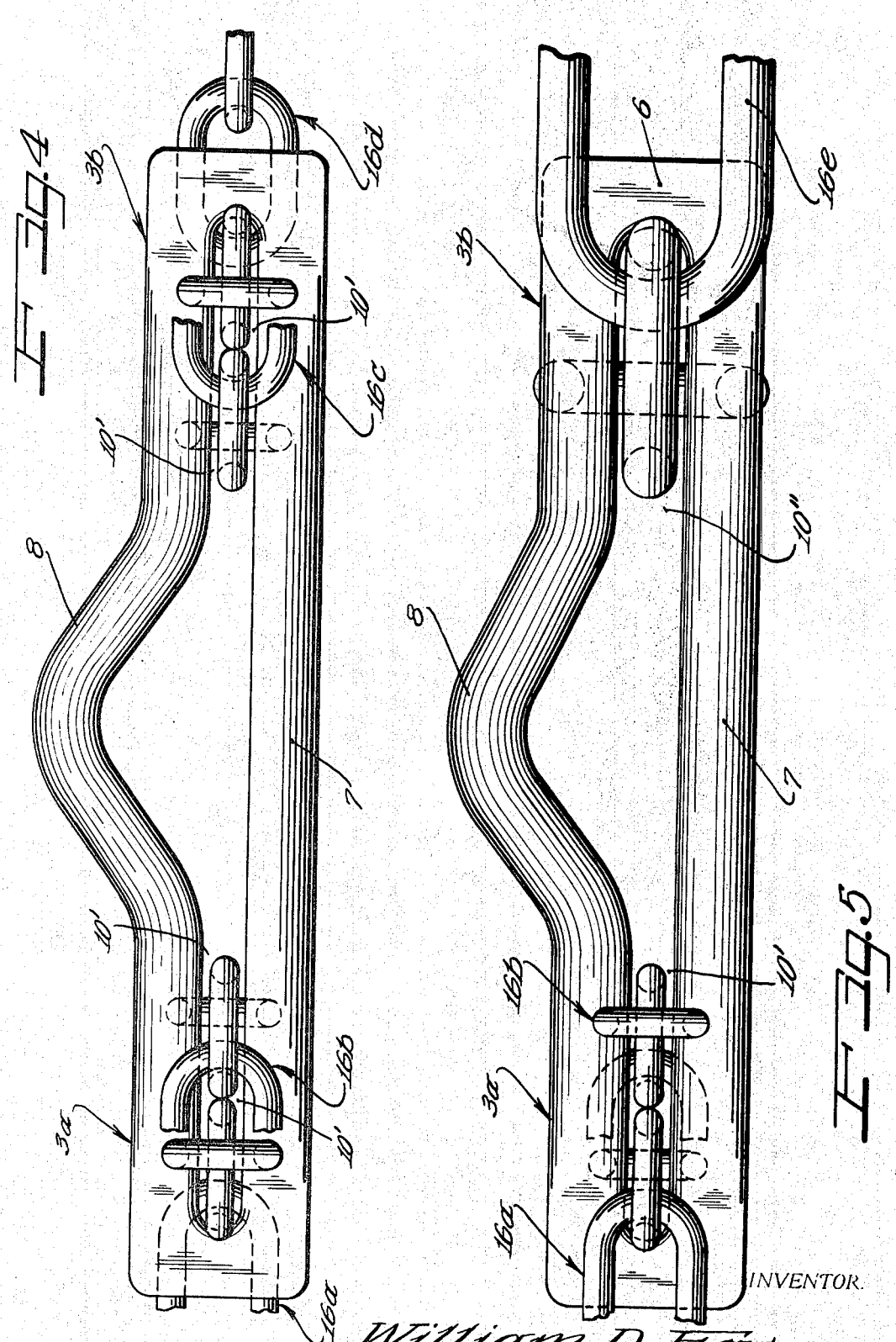

United States Patent Office 3,545,200
Patented Dec. 8, 1970

3,545,200
LINK CHAIN CONNECTOR
William D. Fagan, P.O. Box 50,
Chicago Ridge, Ill. 60415
Filed June 14, 1968, Ser. No. 737,104
Int. Cl. F16g *15/00*
U.S. Cl. 59—93
8 Claims

ABSTRACT OF THE DISCLOSURE

A connector for link chain comprising a body member constructed to receive an intermediate chain link and interlock with adjacent transversely extending links of the chain, and provided with an opening of a size to permit passage of the chain links therethrough to enable interlocking engagement of such chain links with the body member.

BACKGROUND OF THE INVENTION

The invention is directed to a connector structure for effecting connection of the free end of a section of link chain to another element, which may for example be another chain link.

In the past chain hooks have normally been utilized for the connection of a length of chain to another object but such hooks possess disadvantages, among others, being the fact that when engaged with a chain, the end of the hook may project sufficiently to snag on adjacent objects over which the chain may pass, as well as tend to bend or relax with age, and requiring a suitably fabricated connection of the hook to another chain or other element to which the hook is attached, the hook normally being provided with an eye through which the mounting element is attached. Likewise, in such cases the hook forms a permanent part of the object to which it is attached, as for example a length of chain, and thus cannot be readily removed from one chain to another etc.

Such hooks also have the disadvantage that in an effort to provide adequate strength, the hook portion normally is provided with a considerably greater cross-sectional area than, for example, the cross-section of chain to which it is to be employed, as the hook portion must have sufficient rigidity to retain its shape under all normal loads to which it may be subjected. Obviously as the hook portion must be inserted in a link of the chain a limitation on the cross-sectional area of the hook portion results. These limitations in turn substantially restrict engagement of a hook with two lengths of chain which are to be connected to the hook carrying element and it will be apparent that in general the hook must be suitably proportioned with respect to the chain with which it is to be employed and while in some cases a hook designed for a smaller chain might be utilized with a heavier chain, usually a hook designed for the heavier chain cannot be employed with a smaller chain. It is therefore an object of the invention to produce a connector for link chain and the like which may be readily designed to connect a plurality of chains of like or different sizes and in which the chains may be connected in multiple i.e. a plurality of chains connected to function together with respect to a third chain or the like.

A further object of the invention is the production of such a connector which is exceedingly simple in construction, readily engaged with or disengaged from the chains from which it is to be employed, which presents substantially no projecting parts which would tend to snag on objects over which the chain may pass and which is relatively inexpensive to manufacture.

Other objects of the invention will be apparent to those skilled in the art from the disclosure herein given.

BRIEF SUMMARY OF THE INVENTION

The invention is directed to a connector for link chain which in its preferred form comprises an elongated body portion having a pair of aligned elongated slots each of which has a width slightly larger than the cross-sectional thickness of the material forming the respective links of the chain involved. The proportions of the body portion adjacent the respective slots are such that an intermediate link of the chain may be received in the slot with the transversely extending adjacent chain links being engageable with the body portion to form an interlocking connection therebetween. In such preferred form the body portion is formed with an opening disposed between the two slots and communicating therewith, the opening having a size sufficient to permit passage of the chain involved therethrough and thereby facilitate insertion of an intermediate length of the chain involved into the cooperable slot.

Where the connector is to be utilized to connect two pieces of like-sized chain the slots may be of the same size, whereas if the connector is to be employed for connecting two chains of different sizes the respective slots will be accordingly proportioned.

In some cases it may be desirable to connect chains in multiple or in parallel which can be readily accomplished by means of the present invention by lengthening one or both slots of the connector a sufficient distance to accommodate two chain links istead of one whereby two chain ends may be connected to the same end of the connector structure. It is also possible, for example, to connect a length of chain to a connector according to the invention by means of a center link or the like whereby the two ends of the chain form parallel chain elements.

A further feature of the invention involves the provision of a novel shape or configuration to the chain engaging ends of the connector whereby a reinforced, extremely rigid and durable connector structure results.

BRIEF DESCRIPTION OF THE DRAWINGS

In the drawings wherein like reference characters indicate like or corresponding parts;

FIG. 1 is a top plan view of a connector structure embodying the invention, illustrating the engagement of two chain ends therewith;

FIG. 2 is a side elevational view of the connector illustrated in FIG. 1 with portions thereof broken away;

FIG. 3 is a sectional view taken approximately on the line III—III of FIG. 1 and depicting an end elevation of the connector structure;

FIG. 4 is a plan view similar to FIG. 1 of a connector structure in which each of the chain engaging slots thereof are of a length to accommodate two chain links; and FIG. 5 is a plan view of a connector structure similar to that illustrated in FIG. 4 wherein one end of the connector structure is constructed to receive a chain of larger dimensions than the opposite end thereof.

DETAILED DESCRIPTION OF THE INVENTION

Referring to the drawings and more particularly to FIGS. 1–3, the chain connector therein illustrated comprises a body member 1 of rigid construction, fabricated preferably in a form of a steel casting or forging. The body member is of generally elongated configuration having two U-shaped end portions 3a and 3b, which in such embodiment are of like configuration and proportions and comprise a pair of leg portions 4 and 5 which are respectively connected at their outer ends by an intermediate portion 6. In the embodiment illustrated the respective leg portions 5 are disposed in axial alignment and connected by a straight intermediate portion 7 whereby the leg portions 5 and intermediate portions 7 form one continuous member. In like manner the leg portions 4 are connected by an intermediate portion 8, which while disposed in a common plane with leg portions 4 and 5 and intermediate portion 7 is bowed outwardly to form an enlarged opening 9 of a size to permit passage therethrough of the chain to be engaged with the connector member. The leg and intermediate portions of the respective U-shaped portions 3a and 3b define respective slots 10 which have a width as viewed in FIG. 1 somewhat greater than the thickness of the stock forming the links of the chain with which the connector is to be employed while the length of the respective slots is at least equal to the width of a link of such chain.

As will be apparent from a reference to the Figures, particularly FIGS. 2 and 3, the extreme ends of the body member are provided with a generally rectangular configuration, the top and bottom faces 11 and 12, end face 13 of the intermediate portion 6 and adjacent sides 14 of the respective U-shaped portions being flattened to form respective corner portions 15 of increased thickness as compared with the portions 4, 5, 7 and 8. The inner faces of the U-shaped portions 3a and 3b, defining the slots 10, are generally semi-cylindrical as apparent from the drawings while the outer faces of the leg portions 4 and 5 effect a transition from flat faces adjacent the intermediate portions 6 to substantially semi-cylindrical configurations which merge with the portions 7 and 8. This construction provides a reinforced, extremely rigid chain engaging structure in which the leg portions 4 and 5 will not spread under any load which the associated chain is capable of withstanding.

In use, the connector is attached to a chain end, for example of the chain 16, by aligning an intermediate link of the chain with the adjacent slot 10, for example the second link as illustrated, and sliding such intermediate link into the slot 10 whereby the adjacent transversely extending links may bear on the respective leg portions 4 and 5, forming an interlock therewith and preventing longitudinal movement of the chain in either direction transversely to the general plane of the connector. A second chain may be similarly connected to the connector at the opposite end thereof.

While in some cases it may be desirable to insert the ends of both chains from the same side of the connector to dispose the free ends of both chains at the same side to provide clearance at the opposite side with respect to an adjacent object, where a straight pull is involved and other considerations do not necessitate or make it desirable to dispose the free ends of chains at the same side of the connector member, the chains are preferably inserted from opposite sides of the connector, as illustrated in FIGS. 1 and 2, which thus tends to balance bending stresses in the connector body.

It will be appreciated that while the construction thus described is so proportioned that only a single chain link may be received in the respective slot 10, if it is desired to provide parallel chain lengths from one end of the connector this may be accomplished by engaging a chain link disposed adjacent the center of a length of chain with the connector whereby the chain lengths at opposite sides thereof may be connected in parallel to an object.

In some cases, where it is desired to connect two lengths of chain in parallel to the connector, it may be necessary to connect two separate chain ends thereto rather than an intermediate center link as previously described. The connector structure illustrated in FIG. 4 is so constructed that two separate chain ends may be connected to the connector at each end thereof, this being accomplished by so proportioning the connector structure that the link-receiving slots 10' are of a length of receive two chain links, the rest of the connector structure of FIG. 4 being constructed in the same manner as that illustrated in FIGS. 1-3. As clearly illustrated the respective chain ends at each respective end of the connector structure may be inserted from opposite sides thereof whereby the chain links of a pair are disposed at opposite sides of the connector.

While the connector structures thus far described have been constructed for connection to a plurality of links of chain of like size, in some cases it may be desirable, for example, to connect two small chains to a single larger chain, which may be accomplished by use of a connector structure such as that illustrated in FIG. 5. In this embodiment of the invention the U-shaped portion 3a is constructed in the same manner as that illustrated in FIG. 4 to receive the same size chain, while the U-shaped portion 3b is provided with an intermediate portion 6 of increased length to provide a link-receiving slot 10'' of greater width than that of the corresponding slot 10', and of a size to receive the link of a considerably larger chain 16e, an intermediate link of the latter being inserted within the cooperable slot the same manner as previously described for the smaller chain with the adjacent transversely extending links interlocking with the connector member. In this construction the opening 9 preferably is of a size to just permit insertion of the larger chain, this being readily accomplished in the construction illustrated by twisting adjacent links thereof out of their normally right-angled relationship whereby the chain end may be readily passed through the opening 9.

It will be apparent from the above description that a connector embodying the invention may be readily engaged and disengaged with the chains to be employed therewith while the reinforced end construction and straight line arrangement of the portions 5 and 7, which form a single straight tension member disposed substantially in line with the tension transmitted to one chain to another, results in a construction which is extremely efficient and durable in usage.

The connector may be fabricated from any suitable material, depending upon the material and strength of the chains involved, preferably being constructed of steel for heavy duty applications, which may be fabricated by either casting or forging operations.

It will be apparent from the above description that I have provided that a chain connector which provides a very efficient connection with the respective links of a chain, the load bearing chain link engaged with the connector being supported at two points closely adjacent to its connection with the next adjacent link, with the position of the engaging links being such that there is no tendency to twist or bend a link.

Thus having described my invention it will be understood that variations and modifications may be effected without departing from the spirit and scope of the novel concepts of my invention.

I claim:

1. A connector for link chain, comprising a rigid body member having an elongated slot therein at each end thereof, for the reception of a chain link for connecting two chain ends, said slots being axially aligned with one another with each slot having a width greater than the thickness of the stock forming a link of the chain to be received therein, but less than the overall width of such a chain link, the body member being of such cross sectional configuration and proportions at such slots that an intermediate link of a respective chain may be disposed in the associated slot with the adjacent links disposed transversely thereto at each side thereof to prevent transverse withdrawal of each chain, upon tensioning thereof, from the associated slot, said body member having an opening therein of a size to permit passage of such chains therethrough, said opening being disposed intermediate said slots and merging therewith, with one side of each slot and of said opening being defined by a single straight portion of said body member, the other sides of the respective slots being defined by respective straight portions extending parallel to said first-mentioned straight poriton and connected by an outwardly extending bowed portion which defines the opposite side of said opening to form a common access opening for the entry of such intermediate link of each chain into a respective slot, wherein tension stresses from one chain to the other are transmitted along two paths, one of which is a relatively direct path comprising said single straight portion, and the other comprising said bow portion and associated straight portions.

2. A chain connector as defined in claim 1, wherein at least one of said slots is of a length to receive two chain ends.

3. A chain connector as defined in claim 1, wherein one of said slots is of a greater width than the other slot whereby the ends of two differently sized chains may be connected.

4. A connector for link chain comprising a rigid body member having an elongated slot therein of a width greater than the thickness of the stock forming a link of the chain to be connected but less than the overall width of such a chain link, the body member being of such corss sectional configuration and proportions at such slot that an intermediate link of such a chain may be disposed in said slot with the adjacent links disposed transversely thereto at each side thereof to prevent transverse withdrawal of such an intermediate chain link from said slot upon tensioning of such a chain, said body member having an opening therein of a size to permit passage of such a chain therethrough, said opening merging with said slot and providing access for entry of such an intermediate chain link into said slot, that part of the body member defining said slot being generally U-shaped, the free end portions of the legs of which are of generally circular cross section, while the intermediate connecting portion thereof and adjacent portions of said legs are provided with respective flat outer faces whereby the free end portion of the body member thereat is of a generally rectangular configuration which merges with the circular cross section of the leg portions, said rectangular configuration providing a reinforcement at such end.

5. A chain connector as defined in claim 4, wherein said body member is of elongated configuration, each end of the body member being of such U-shaped configuration to provide two chain-receiving slots, each free end portion of the body member being provided with said generally rectangular configuration and the remaining portions of said body member being of generally circular cross-section.

6. A chain connector as defined in claim 5, wherein at least one of said slots is of a length to receive two chain ends.

7. A chain connector as defined in claim 5, wherein both slots are of a length to receive two chain ends.

8. A chain connector as defined in claim 5, wherein one of said slots is of a greater width than the other slot whereby the ends of two differently sized chains may be connected.

References Cited

UNITED STATES PATENTS

| | | | |
|---|---|---|---|
| 419,725 | 1/1890 | Snyder | 24—116 |
| 1,507,651 | 9/1924 | Young | 24—116 |
| 2,165,377 | 7/1939 | Henry | 24—116 |
| 3,027,615 | 4/1962 | Forney | 24—116 |
| 3,282,045 | 11/1966 | Thelan | 59—93 |

FOREIGN PATENTS 61,972 6/1925 Sweden.

CHARLES W. LANHAM, Primary Examiner

G. P. CROSBY, Assistant Examiner

U.S. Cl. X.R.

24—116